United States Patent [19]

DeLuca et al.

[11] Patent Number: 5,049,875
[45] Date of Patent: Sep. 17, 1991

[54] METHOD AND APPARATUS FOR OUT OF RANGE DETECTION IN RESPONSE TO NONDETECTION OF PREDETERMINED BAUD RATES

[75] Inventors: Joan S. DeLuca, Boca Raton; Richard A. Erhart, Boynton Beach; Michael J. DeLuca, Boca Raton, all of Fla.

[73] Assignee: Motorola Inc., Schaumburg, Ill.

[21] Appl. No.: 406,489

[22] Filed: Sep. 13, 1989

[51] Int. Cl.$^5$ ............................................. H04Q 7/00
[52] U.S. Cl. ............................... 340/825.44; 340/539; 340/825.49; 455/229; 370/84
[58] Field of Search ................. 340/825.44, 825.49, 340/311.1, 571, 539, 572, 825.64, 825.44; 370/84; 379/59, 60; 455/38, 229, 33; 375/10, 121

[56] References Cited

U.S. PATENT DOCUMENTS 4,413,261 11/1983 Greenberg ..................... 340/825.64
4,414,676 11/1983 Kraul et al. ........................ 375/116
4,424,514 1/1984 Fennell et al. ................. 340/825.52
4,506,262 3/1985 Vance et al. .................... 340/825.44
4,518,961 5/1985 Davis et al. .................... 340/825.44
4,554,665 11/1985 Beesley ................................ 371/55
4,593,273 6/1986 Narcisse ............................. 340/539
4,734,694 3/1988 Umetsu et al. ................. 340/825.48
4,851,820 7/1989 Fernandez ........................... 455/229
4,887,280 12/1989 Reisenfeld .......................... 375/121

Primary Examiner—Donald J. Yusko
Assistant Examiner—Peter S. Weissman
Attorney, Agent, or Firm—Daniel R. Collopy; Vincent B. Ingrassia; William E. Koch

[57] ABSTRACT

A baud rate detector determines the baud rates of signals received by a selective call receiver. If the signals have no detectable baud rate or the baud rate of the received signals does not match that of a plurality of known selective call network transmission baud rates, the selective call receiver indicates to its user that it is out of range of the network's transmitters.

13 Claims, 3 Drawing Sheets

METHOD AND APPARATUS FOR OUT OF RANGE DETECTION IN RESPONSE TO NONDETECTION OF PREDETERMINED BAUD RATES

FIELD OF THE INVENTION

This invention relates in general to selective call receivers, and in particular to an out of range detector for a selective call receiver.

BACKGROUND OF THE INVENTION

Every selective call network system has an associated coverage area corresponding to the reception area of the system's transmitters which relay messages at an assigned frequency from the selective call network terminal to selective call receivers. As a selective call receiver increases its distance from the network transmitters, reception on the assigned frequency becomes more difficult until, eventually, the selective call receiver is out of range of the transmitters.

It is desirable that a selective call receiver user be aware of when the selective call receiver is out of range. The receiver will not receive any messages while out of range. If the user is expecting an important message, detection of out of range will indicate that the user needs to return to the network coverage area or access alternative methods for retrieving messages.

Selective call network signalling typically utilizes one or two binary frequency shift keying (FSK) modulation signalling protocols: either the POCSAG signalling code or the Golay Sequencing Code (GSC), or both. POCSAG is a protocol originally proposed by British Telecom and an anagram for the Post Office Code Standardization Advisory Group. The POCSAG protocol receivers perform separate bit and frame synchronization operations. Bit synchronization is a process used to determine the presence of bit boundaries of a data transmission having bits transmitted at a predetermined baud rate, and thereafter to provide a clock to synchronously sample the bits. Frame synchronization frames the bits transmitted so that the data transmitted is in a form to be decoded thereby indicating various word boundaries such as the first bit of address and data signals.

The preamble of a POCSAG signal comprises a number of zero-to-one transitions. One method for POCSAG bit synchronization is described in U.S. Pat. No. 4,506,262. Generally, with POCSAG signalling, once bit synchronization has been obtained, the receiver remains in synchronous communication with the transmitter until the signal is dropped, i.e., bit synchronization does not need to be processed repeatedly. The first word following the preamble is a sync code word which contains a predetermined binary sequence used for frame synchronization. Sixteen words of information follow before the sync code is repeated. The sync code provides a means for detection of frame synchronization. It can be appreciated that if the POCSAG protocol is ignored, the data bits can appear to be effectively a random sequence of data transmitted at a predetermined baud rate, normally 512 bits per second (bps).

Since frame synchronization is repeated every seventeenth word of transmission, POCSAG selective call receivers have an inherent means of out of range detection. If frame synchronization has been detected, the POCSAG selective call receiver looks in the following information for its address and an associated message. If no frame synchronization has been detected within a period of time substantially greater than the time to transmit sixteen words (five minutes, for example), the POCSAG selective call receiver can declare out of range.

With selective call receivers using the Golay Sequencing Code (GSC), out of range detection cannot be detected using frame synchronization. Unlike POCSAG, GSC selective call receivers must simultaneously gain bit and frame synchronization. The preamble of the GSC signal, lasting more than one second, contains a repeated twenty-three bit predetermined sequence of signals. In a GSC paging network, the receivers are divided into a plurality of groups and the twenty three bit code in the preamble selects only a first one of the groups. Synchronization to the GSC signal is disclosed in U.S. Pat. No. 4,424,514. Thus other groups of GSC selective call receivers do not synchronize to a GSC signal which selects the first group. Furthermore, since GSC is transmitted at 600 bps, POCSAG selective call receivers cannot bit synchronize to the GSC signal even though the POCSAG receivers are in range. Therefore, the GSC receivers must sample the transmission until it detects synchronization with its own predetermined preamble. Following the preamble, a start code indicates that the preamble is finished and the information following contains addresses of selective call receivers within the group and information in a pattern of eight information words followed by one start code word. The GSC receivers within the network coverage area which are not in the group preambled, do not detect synchronization and therefore cannot detect whether they are out of range of the transmitter or whether their group has not been transmitted to by the transmitter. Furthermore, because the POCSAG signal does not contain the 600 bps twenty-three bit preamble signal required for a single group of GSC selective call receivers to synchronize, GSC selective call receivers cannot detect a POCSAG signal even though they are in range of the transmitter.

Thus, what is needed is a method for detecting if a selective call receiver is out of range of its transmitter for both the GSC and the POCSAG signalling protocols.

SUMMARY OF THE INVENTION

Accordingly, it is an object of the present invention to provide an improved method for detecting if a selective call receiver is out of its corresponding transmitter's range.

In carrying out the above and other objects of the invention in one form, there is provided a method for detecting if a selective call receiver is out of its selective call network coverage area and providing an indication that a predetermined baud rate is not detected.

DETAILED DESCRIPTION OF THE INVENTION

Figure 1:
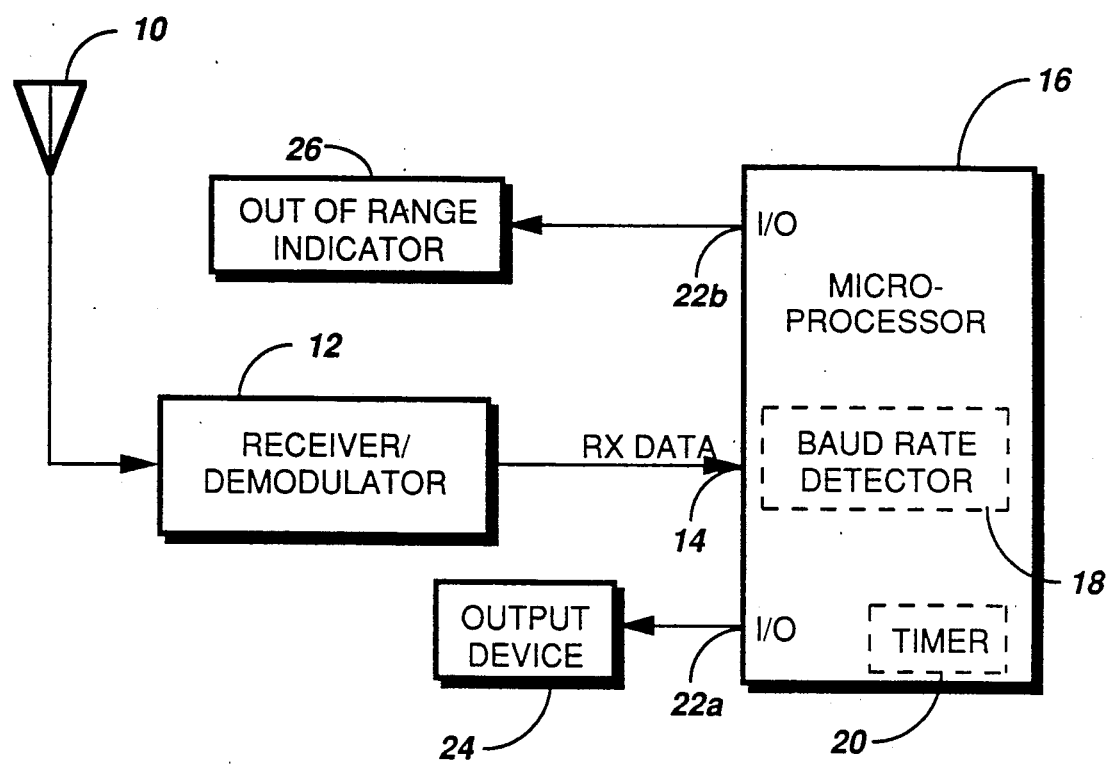
FIG. 1 is a block diagram of a selective call receiver according to the present invention.

Referring to FIG. 1, a selective call receiver receives signals via an antenna 10. A receiver/demodulator circuit 12 demodulates the received signals on one of a plurality of frequencies and provides the demodulated signals to a data port (RX DATA) 14 of a microprocessor 16. The microprocessor 16 includes a baud rate detector 18 and a timer 20. The baud rate detector 18 can be comprised within a software program such as that disclosed in U.S. Pat. No. 4,518,961 assigned to the assignee of the present invention which is hereby incorporated by reference. An alternate baud rate detector is disclosed in U.S. patent application Ser. No. 07/306,124, filed Feb. 6, 1989, assigned to the assignee of the present invention, which is also hereby incorporated by reference. The timer 20 can be an internal microprocessor clock accessible by software in a manner well known to those skilled in the art.

The microprocessor 16 includes at least two input-/output (I/O) ports 22a and 22b and may be programmed to synchronize and decode paging signals on either the POCSAG protocol or the GSC protocol. When synchronization to the programmed protocol has been achieved, the receiver's address has been detected and the signal has been decoded, an output is provided to an output device 24 via I/O port 22a. The output device 24 could be an audio amplifier and a speaker for providing audio output or a liquid crystal display (LCD) for providing a visual output. If the operation of the microprocessor 16 determines that the receiver is out of the coverage area of its network selective call system's transmitters by the inability of the baud rate detector 18 to detect a predetermined baud rate or baud rates on the system's frequency, a signal is provided from I/O port 22b to an out of range indicator 26. The indicator 26 could take the form of a means for supplying a tone of a specific frequency to an audio amplifier and thence to a speaker in an audio output device 24 for an audio alert. The indicator 26 could also take the form of an icon of a particular shape (e.g. an antenna) for display on or flashing on an LCD visual output device 24.

Figure 2:
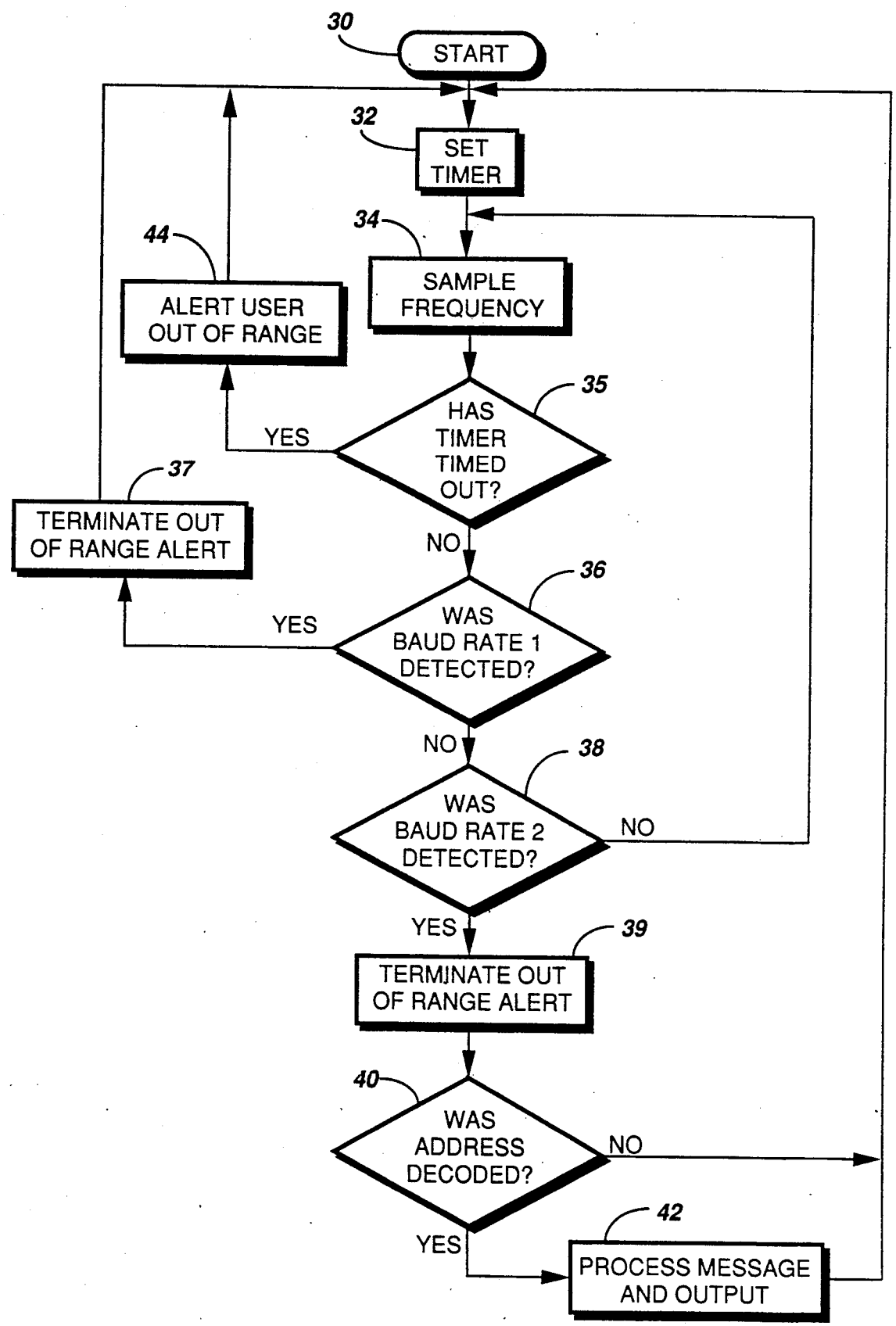
FIG. 2 is a flowchart of the operation of the preferred embodiment according to the present invention.

Referring next to FIG. 2, the operation of the preferred embodiment of an out of range detector for a selective call receiver begins with START block 30 when the selective call receiver is powered up. The timer is set to a predetermined time period 32, for example two minutes, sufficiently long to allow for an out of range determination. The selective call network frequency is sampled 34, i.e. signals are received by the antenna 10, demodulated by the receiver/demodulator 12, and baud rate detection is attempted by the microprocessor 16 (FIG. 1). If the timer has not timed out 35, the baud rate detector 18 (FIG. 1) attempts to detect a first baud rate 36. Detection of the first baud rate is handled by the baud rate detector 18 in a conventional manner by sampling the selective call network frequency for signalling indicative of the first baud rate, a predetermined baud rate which is identified by information stored in memory within the microprocessor 16. If the first baud rate is not detected 36, the baud rate detector attempts to detect a second baud rate 38. Sampling for the second frequency is similar to sampling for the first frequency, except that the frequency is sampled for information indicative of digital signals at the second baud rate as identified by information stored within the microprocessor 16 identifying a second predetermined baud rate. For example, the first baud rate could be 512 bps indicating POCSAG signalling and the second baud rate could be 600 bps indicating GSC signalling. The second baud rate is the baud rate indicating the particular protocol in which the selective call receiver typically receives messages.

If the first predetermined baud rate is detected 36, the out of range alert is terminated, if it has been activated, and the operation of the receiver resets the timer 32 and samples the baud rate 34.

If the baud rate matching the baud rates of the protocol to be decoded (i.e. BAUD RATE 2) is detected within the received signals 38, the selective call receiver is determined to be within network reception range and the out of range alert is terminated 39 if it has previously been activated. The microprocessor then synchronizes to the signal and looks for the selective call receiver's address within the message information 40. If the receiver's address is not decoded 40, the timer is reset 32 and the baud rate is again sampled 34. If the receiver's address is detected 40, the message is processed 42 and output to the output device 24 (FIG. 1). After message processing, the operation of the receiver resets the timer 32 and samples the baud rate 34.

If the second predetermined baud rate is not detected 38, the operation of the receiver continues sampling 34 until either the timer times out 35 or one of the baud rates is detected 36, 38. If the timer times out with no baud rate detected 35, the user of the receiver is alerted to the fact that the receiver is out of network reception range 44 by activating the out of range indicator 26 (FIG. 1). The operation of the receiver will reset the timer 32 and continue to sample the frequency 34 until the baud rate is detected in response to which the out of range detector is terminated 37, 39.

Thus in operation, a selective call receiver which decodes the GSC protocol would first baud rate detect for 512 bps. If a POCSAG signal is detected, the out of range detector would be deactivated if previously activated. If not detected, the baud rate detector would then be programmed to detect 600 bps signals which are indicative of the GSC protocol. If after a predetermined time, neither 512 bps nor 600 bps is detected, the out of range indicator is activated. If the GSC signal is detected, the signal would be synchronized to and regular decoding begins. Since the paging service transmits both POCSAG and GSC protocols, detection of the GSC baud rate indicates the selective call receiver is still in range even though no POCSAG signals have been received in the predetermined time. The baud rate detector can detect GSC without having to synchronize to the GSC signal thereby simplifying the construction of the selective call receiver. Alternatively, a selective call receiver programmed to decode one GSC group can use the 600 bps baud rate detector to detect the presence of any GSC signal, thereby providing a reliable means for determining out of range. The GSC selective call receiver may additionally reprogram the baud rate detector to 512 bps in order to detect the POCSAG protocol if the 600 bps baud rate is not detected. In an alternate embodiment, the baud rate detector may be programmed to detect any known baud rate of other signalling protocols transmitted by the selective call network system. The baud rate detector has the further advantage of quickly detecting the presence of a protocol at any portion of the transmission of the protocol without synchronizing to the protocol. This simplifies the design of the selective call receiver and also provides for improved battery saving in the absence of a protocol or digital signalling scheme, because detection of the absence of a baud rate may be made quicker than detection of the inability to synchronize to the protocol and nondetection of a digital signalling scheme allows for improved battery saving when nondigital signalling schemes are being transmitted or no transmissions are modulated on the carrier.

Figure 3:
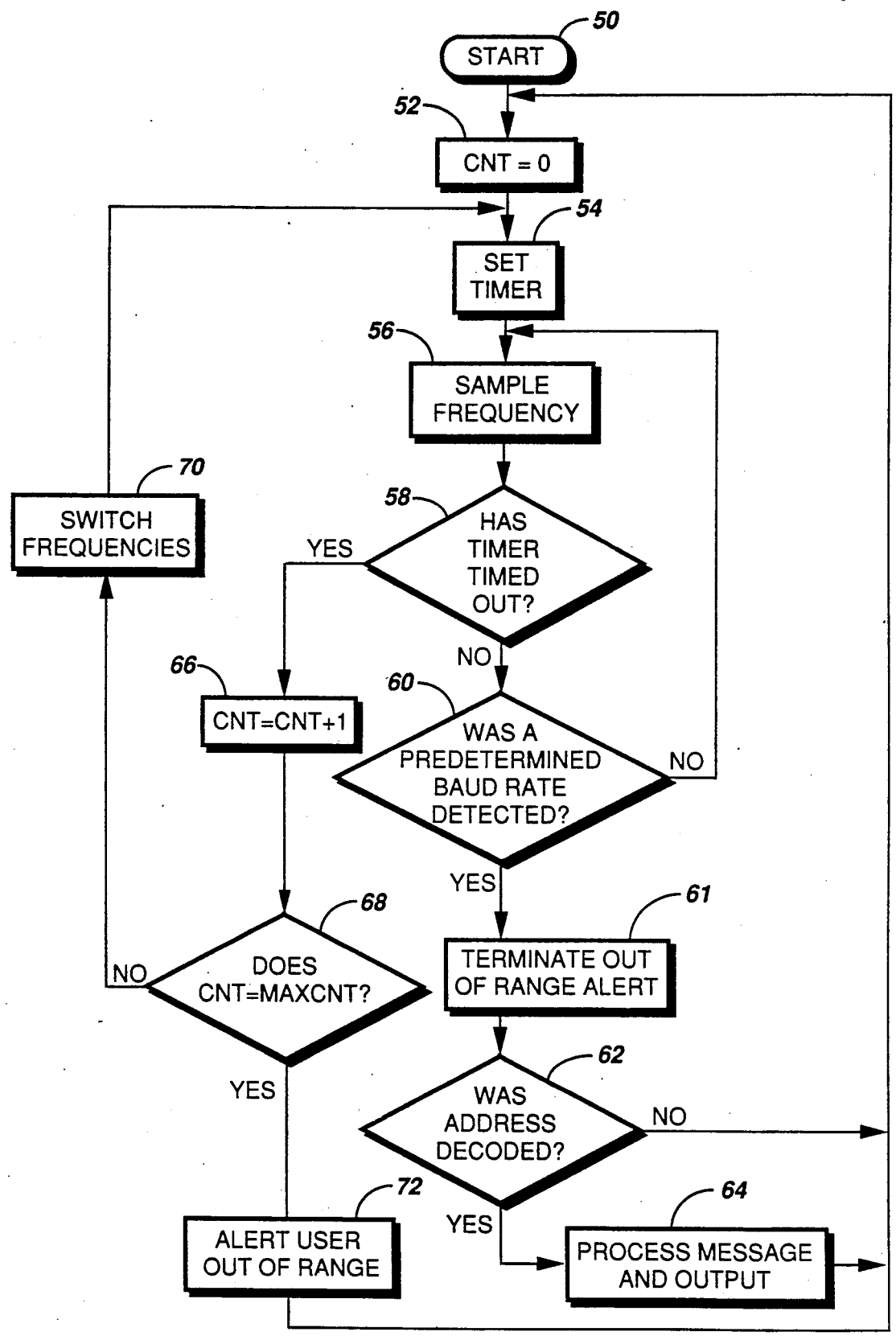
FIG. 3 is a flowchart of the operation of an alternate embodiment according to the present invention.

Referring to FIG. 3, an alternate embodiment of the invention suitable for receivers capable of operating on more than one frequency allows for scanning the frequencies in search of messages. After power is turned on 50, a counter CNT is initialized to zero 52. CNT counts the number of frequencies scanned for baud rate detection. The microprocessor timer is set 54 in the manner described above and the first frequency is sampled 56. If the timer has not timed out 58, the baud rate detector 18 (FIG. 1) attempts to detect either of two baud rates 60 as described above.

If either baud rate is detected within the received signals 60, the selective call receiver is determined to be in range and the out of range alert is terminated 61 if previously activated. The microprocessor then synchronizes to the signal and looks for the selective call receiver's address within the message information 62. If the receiver's address is not detected 62, the timer is reset 54 and the network frequency is sampled 56. If the receiver's address is detected 62, the message is processed 64 and output to output device 24 (FIG. 1). After message processing, the operation of the receiver resets the timer 54 and samples the network frequency 56.

If neither baud rate is detected 60, the operation of the receiver continues sampling the frequency 56 until either the timer times out 58 or one of the baud rates is detected 60. If the timer times out with no baud rate detected 58, CNT is incremented by one 66 and CNT is examined to see if it is equal to a constant MAXCNT 68. MAXCNT is the number of frequencies which the receiver scans. If CNT does not equal MAXCNT 68, the frequency is switched to another frequency 70, the timer is reset 54, and the new frequency is sampled 56. If CNT equals MAXCNT, the user of the receiver is alerted to the fact that the receiver is out of network reception range 72 by activating the out of range indicator 26 (FIG. 1). The operation of the receiver will reinitialize CNT 52, reset the timer 54, and continue to sample the frequencies 56 until the baud rate is detected or the receiver's power is turned off. With several frequencies to sample, the timer will necessarily be much smaller and of a value to allow enough time for frequency sampling but not miss messages on the other frequencies. Furthermore, the nondetection of any digital signalling protocol on the frequency before shifting frequencies, permits more accurate frequency sampling leading to the development of improved battery saving schemes with less time spent on each frequency.

We claim:

1. A method in a selective call receiver operating in a selective call network system having a network reception range and broadcasting signals therefrom, said signals having a plurality of predetermined baud rates and comprising first message signals and second message signals, said first message signals having a first baud rate of said plurality of predetermined baud rates and intended for reception by said selective call receiver and said second message signals having one of said plurality of predetermined baud rates other than said first baud rate and not intended for reception by said selective call receiver, the method comprising the step of providing an indication that the selective call receiver is out of said network reception range if said selective call receiver does not detect any of said plurality of predetermined baud rates of said first and second message signals.

2. The method of claim 1 further comprising before said step of providing an indication that a receiver is out of range, the step of baud rate detecting for a predetermined time period in order to determine whether any of said plurality of predetermined baud rates are detected.

3. The method of claim 1 wherein said signals are broadcast and received on at least one frequency.

4. An out of range detector comprising:
receiver means for receiving signals having a plurality of predetermined signalling formats and having a plurality of predetermined baud rates, including signals having one of said plurality of predetermined baud rates; and
baud rate detection means coupled to said receiver means for generating an out of range signal if said signals are not of any of said plurality of predetermined baud rates irrespective of which of the plurality of predetermined signalling formats said signals have.

5. The out of range detector of claim 4 further comprising:
decoding means coupled to said receiving means for decoding message information from said signals according to a predetermined one of said plurality of predetermined signalling formats in response to said baud rate detection means detecting said one of said plurality of predetermined baud rates.

6. The out of range detector of claim 4 wherein said receiver means receives messages on a plurality of frequencies and further comprises:
frequency switching means for switching said receiver means to a second frequency in response to said out of range signal.

7. The out of range detector of claim 4 further comprising:
an alert means for generating a audio output in response to said out of range signal.

8. The out of range detector of claim 4 further comprising:
an alert means for generating a visual output in response to said out of range signal.

9. The out of range detector of claim 4 further comprising:
power conservation means coupled to said receiver means for switching said receiver means off for a predetermined time duration in response to said out of range signal.

10. An out of range detector comprising:
receiver means for receiving signals having information received at a plurality of predetermined baud rates;
baud rate detection means coupled to said receiver means for switching an out of range signal from a first state to a second state if said signals are not of any of said plurality of predetermined baud rates irrespective of said information;
decoding means coupled to said receiving means for decoding said information from said signals in response to said baud rate detection means detecting a predetermined one of said plurality of predetermined baud rates;

alert means for generating an output in response to said out of range signal being in said second state; and alert termination means for switching said out of range signal from said second state to said first state if said signals are of any of said plurality of predetermined baud rates.

11. The out of range detector of claim 9 wherein said output comprises an audio output.

12. The out of range detector of claim 9 wherein said output comprises a visual output.

13. A selective call receiver having an address comprising:

an antenna for receiving signals comprising first message signals and second message signals, said first message signals intended for reception by said selective call receiver, comprising address signals corresponding to said address, and having a first of a plurality of predetermined baud rates and said second message signals not intended for reception by said selective call receiver and having a second of said plurality of predetermined baud rates;

a receiver circuit coupled to said antenna for receiving and demodulating said first and second message signals on at least one frequency;

decoder means coupled to said antenna for decoding said first message signals according to a predetermined signalling format;

baud rate detection means coupled to said receiver circuit for determining whether said first and second message signals have one of said plurality of predetermined baud rates;

indication means coupled to said baud rate detection means for generating an out of range signal if said signals do not have any of said plurality of predetermined baud rates;

message generating means coupled to said decoder and said baud rate detection means for generating a message from said first message signals; and output means for presenting said message.

* * * * *